(12) United States Patent
Taguchi et al.

(10) Patent No.: US 7,265,076 B2
(45) Date of Patent: Sep. 4, 2007

(54) CO REMOVAL CATALYST, METHOD OF PRODUCING CO REMOVAL CATALYST, HYDROGEN PURIFYING DEVICE AND FUEL CELL SYSTEM

(75) Inventors: Kiyoshi Taguchi, Osaka (JP); Kunihiro Ukai, Nara (JP); Hidenobu Wakita, Kyoto (JP); Seiji Fujihara, Osaka (JP)

(73) Assignee: Matsushita Electric Industrial Co, Ltd., Osaka (JP)

( * ) Notice: Subject to any disclaimer, the term of this patent is extended or adjusted under 35 U.S.C. 154(b) by 248 days.

(21) Appl. No.: 10/745,223

(22) Filed: Dec. 22, 2003

(65) Prior Publication Data

US 2004/0180781 A1     Sep. 16, 2004

(30) Foreign Application Priority Data

Dec. 26, 2002     (JP)     ............... 2002-378509

(51) Int. Cl.
*B01J 23/00*     (2006.01)
*B01J 21/00*     (2006.01)

(52) U.S. Cl. ............ 502/326; 502/304; 502/339; 502/349; 502/439

(58) Field of Classification Search ........ 502/304, 502/326, 349, 439, 339
See application file for complete search history.

(56) References Cited

U.S. PATENT DOCUMENTS

| | | | |
|---|---|---|---|
| 4,927,799 A * | 5/1990 | Matsumoto et al. | 502/303 |
| 4,957,896 A * | 9/1990 | Matsumoto et al. | 502/304 |
| 5,015,617 A * | 5/1991 | Ohata et al. | 502/304 |
| 5,075,276 A * | 12/1991 | Ozawa et al. | 502/304 |
| 5,137,992 A * | 8/1992 | Kawakami et al. | 525/537 |
| 5,260,249 A * | 11/1993 | Shiraishi et al. | 502/304 |
| 5,318,757 A * | 6/1994 | Abe et al. | 422/174 |
| 5,532,198 A * | 7/1996 | Chopin et al. | 502/304 |
| 5,607,892 A * | 3/1997 | Chopin et al. | 502/304 |
| 5,945,369 A | 8/1999 | Kimura et al. | |
| 5,948,377 A * | 9/1999 | Sung | 423/213.5 |
| 5,958,827 A * | 9/1999 | Suda et al. | 502/304 |
| 6,150,288 A * | 11/2000 | Suzuki et al. | 501/105 |
| 6,171,572 B1 | 1/2001 | Aozasa | |
| 6,180,075 B1 * | 1/2001 | Lindner et al. | 423/213.2 |
| 6,248,688 B1 * | 6/2001 | Wu et al. | 502/302 |
| 6,306,794 B1 * | 10/2001 | Suzuki et al. | 502/304 |
| 6,335,305 B1 | 1/2002 | Suzuki et al. | |

(Continued)

FOREIGN PATENT DOCUMENTS

EP     1 046 612     10/2000

(Continued)

*Primary Examiner*—Cam N. Nguyen
(74) *Attorney, Agent, or Firm*—RatnerPrestia (57) ABSTRACT

A CO removal catalyst of inducing CO shift reaction for allowing water and carbon monoxide to react to produce hydrogen and carbon dioxide, comprising a catalyst carrier having a cerium-zirconium composite oxide and a zirconium oxide and a predetermined noble metal supported on the catalyst carrier, wherein the average particle diameter of the particulate cerium-zirconium composite oxide is greater than the average particle diameter of the particulate zirconium oxide, the average particle diameter of the particulate zirconium oxide is greater than the average particle diameter of the predetermined particulate noble metal and the predetermined noble metal is supported on the catalyst carrier more in the outer part thereof.

11 Claims, 4 Drawing Sheets

U.S. PATENT DOCUMENTS

| | | |
|---|---|---|
| 6,455,182 B1 | 9/2002 | Silver |
| 6,555,088 B1 | 4/2003 | Baumann et al. |
| 6,576,207 B1 * | 6/2003 | Mussmann et al. ......... 423/212 |
| 6,806,225 B1 * | 10/2004 | Ikeda et al. ................. 502/326 |
| 6,852,665 B2 * | 2/2005 | Morikawa et al. .......... 502/302 |
| 2003/0129100 A1 | 7/2003 | Ukai et al. |

FOREIGN PATENT DOCUMENTS

| | | |
|---|---|---|
| EP | 1 136 441 | 9/2001 |
| JP | 5-253484 | 10/1993 |
| JP | 08-155302 | 6/1996 |
| JP | 10-151348 | 6/1998 |
| JP | 2000-271480 | 10/2000 |
| JP | 2000-302410 | 10/2000 |
| JP | 2001-079391 | 3/2001 |
| JP | 2001-316682 | 11/2001 |
| JP | 2001-322803 | 11/2001 |
| JP | 2002-095966 | 4/2002 |
| JP | 2002-128507 | 5/2002 |
| JP | 2002-273227 | 9/2002 |
| JP | 2003-200048 | 7/2003 |
| WO | WO 00/48261 | 8/2000 |

* cited by examiner

CO REMOVAL CATALYST, METHOD OF PRODUCING CO REMOVAL CATALYST, HYDROGEN PURIFYING DEVICE AND FUEL CELL SYSTEM

BACKGROUND OF THE INVENTION

1. Field of the Invention

The present invention relates to a CO removal catalyst of purifying a modified gas mainly composed of hydrogen containing carbon monoxide (hereinafter referred to as "CO") to provide a high purity hydrogen gas, a method of producing a CO removal catalyst, a hydrogen purifying device and a fuel cell system.

2. Related Art of the Invention

As a hydrogen source for fuel cell there is used a modified gas obtained by the modification of hydrocarbon, alcohol, ether, etc. However, a solid polymer type fuel cell which operates at a temperature as low as not higher than 100° C. is subject to poisoning of Pt catalyst used in the electrode of the fuel cell by CO contained in the modified gas. When the Pt catalyst is poisoned, the reaction of hydrogen is inhibited, causing a remarkable drop of the electricity-generation efficiency of the fuel cell. It is therefore necessary that CO be removed to a concentration of not higher than 100 ppm, preferably not higher than 10 ppm by using a hydrogen purifying device.

In general, in order to remove CO, CO and water vapor are subjected to aqueous gas shift reaction (CO modification reaction) at a CO modifying portion comprising a CO modification catalyst in the hydrogen purifying device so that they are converted to carbon dioxide and hydrogen to reduce CO concentration to a range of from thousand parts per million to about 1%.

Thereafter, a slightly amount of air is used to add oxygen to the modified gas. With a CO selective oxidation catalyst, CO is then removed to a level of several parts per million, where the fuel cell cannot be adversely affected. In order to remove CO thoroughly, it is necessary that oxygen be added in an amount of from about 1 to 3 times CO concentration. However, hydrogen, too, is consumed according to the amount of oxygen. When CO concentration is high, the amount of oxygen to be added increases, causing the rise of the consumed amount of hydrogen and hence causing a drastic drop of the efficiency of the entire device.

Accordingly, it is necessary that CO concentration in the CO modifying portion comprising a CO modification catalyst be thoroughly reduced.

When used in ordinary houses, the device must be frequently actuated or suspended. Therefore, the device is required to have resistance to heat shock or entrance of air.

Referring to CO modification catalyst, as a low temperature CO modification catalyst there has been heretofore used a copper-zinc-based catalyst or copper-chromium-based catalyst, which can be used at a temperature of from 150° C. to 300° C. As a high temperature CO modification catalyst there has been used an iron-chromium-based catalyst, which performs at a temperature of not lower than 300° C. Referring to the use of these CO modification catalysts, the low temperature CO modification catalyst has been used singly or in combination with the high temperature CO modification catalyst depending on purposes such as chemical plant and hydrogen generator for fuel cell.

When a copper-based low temperature CO modification catalyst is mainly used, a very high catalyst activity can be obtained. However, it is necessary that such a copper-based low temperature CO modification catalyst be subjected to reduction before use so that it is activated. Further, in order to prevent the catalyst from being heated to a temperature beyond its heat resistance due to the heat generation during the activation, it is necessary that the catalyst be processed in a long period of time while the supplied amount of the reducing gas being adjusted. Moreover, since the CO modification catalyst which has once been activated can be reoxidized and deteriorated when mixed with oxygen during the suspension of the device or other occasions, some countermeasures such as antioxidation treatment are needed. Further, since the low temperature CO modification catalyst has a low heat resistance and thus cannot be rapidly heated during the starting of the device, some countermeasures involving gradual heating or the like are needed.

On the other hand, when only a high temperature CO modification catalyst is used, the catalyst be easily heated during starting because the catalyst has a high heat resistance and thus can be heated to a temperature as high as about 500° C. without any problem. However, CO modification reaction is an equilibrium reaction that can difficultly proceed toward the reduction of CO concentration at high temperatures. Thus, when the high temperature CO modification catalyst, which performs only at high temperatures, is used, CO concentration can be difficultly reduced to not higher than 1%. Therefore, the purification efficiency at a CO purifying portion provided after this stage can be reduced.

In order to avoid the aforementioned shortcomings of the related art catalysts, noble metal modification catalysts mainly composed of Pt, which is excellent in heat resistance as well as in oxidation resistance, having a higher low-temperature activity than iron-chromium catalyst are disclosed (as in JP-A-2000-302410, for instance).

The entire disclosure of JP-A-2000-302410 is incorporated herein by reference in its entirety.

More particularly, JP-A-2000-302410 discloses the use of a pelletized cerium-zirconium composite oxide as a noble metal modification catalyst.

Further, a noble metal catalyst having Pt and optionally Re and Pt supported on a zirconia carrier is disclosed (see Japanese Patent No. 3215680, for instance).

The disclosure of Japanese Patent No. 3215680 is incorporated herein by reference in its entirety.

Moreover, a noble metal catalyst having Pt supported on a carrier having a base point such as titania on which a rare earth element such as La and Ce has been supported is disclosed (see WO00/48261 (PCT application), for instance).

The disclosure of WO00/48261 (PCT application) is incorporated herein by reference in its entirety.

Besides the aforementioned disclosures, similar noble metal catalysts are disclosed (see JP-A-2001-316682 and JP-A-2001-322803, for instance).

The disclosure of JP-A-2001-316682 and JP-A-2001-322803 are incorporated herein by reference in its entirety.

Further, it is disclosed that as a binder for pelletization of rutile titania there is preferably used zirconia sol (see JP-A-2002-128507 and JP-A-2002-95966, for instance).

The disclosure of JP-A-2002-128507 and JP-A-2002-95966 are incorporated herein by reference in its entirety.

The noble metal catalysts disclosed in the aforementioned patents are worked into tablets or spherical forms which are then packed in the reactor. Referring to the method of preparing the catalyst, a metal oxide which is stable at high temperatures or in a reducing atmosphere such as alumina, zirconia and titania is formed into tablets or spherical forms. An additive such as alkali and rare earth elements is supported on the carrier thus formed. Finally, a noble metal such as Pt is supported on the carrier.

However, the aforementioned related art catalysts are disadvantageous in that the additive (alkali, alkaline earth, transition metal and rare earth elements) cannot be supported on the molded alumina, zirconia or titania (catalyst carrier) up to the interior thereof and only the noble metal supported on the outer part of the catalyst carrier in which the additive is present can perform. Further, the noble metal supported on the portion of the carrier such as alumina, zirconia and titania in which the additive is not present not only is wasteful but also can cause methanization reaction which is a side reaction.

In order to obtain a sufficient catalyst activity or reaction selectivity, it is necessary that a large amount of a noble metal be supported on the catalyst or the catalyst be used at low temperatures where methanization reaction which is a side reaction can occur little but the reaction rate is lowered.

In the case where Pt is supported on ceria, ceria reacts with carbon dioxide or water in the modified gas to produce carbonates which then cover the surface of Pt, causing the deterioration of the catalyst activity. However, in the case where Pt is supported on a cerium-zirconium composite oxide, zirconium, which is a stable element, inhibits the deterioration of the catalyst activity.

However, such a cerium-zirconium composite oxide may have a slight amount of an amorphous free ceria crystal present therein even when observed by X-ray diffractometry to have a single phase crystal formed therein. This is because ceria which has been left undissolved in solid state in the cerium-zirconium composite oxide during the preparation of the cerium-zirconium composite oxide separates out on the surface of the cerium-zirconium composite oxide.

The inventors noticed that ceria which has thus separated out can react with carbon dioxide or water in the modified gas to produce carbonates which then cover the surface of Pt to lower the catalyst activity.

Therefore, there is a problem that CO removal catalysts for use in fuel cell electricity generation leave something to be desired in properties.

It is an aim of the invention to provide a CO removal catalyst having improvements in catalyst properties for use in fuel cell electricity generation, a method of producing such a CO removal catalyst, a hydrogen purifying device and a fuel cell system in the light of the aforementioned problems with the related art technique.

SUMMARY OF THE INVENTION

The $1^{st}$ aspect of the present invention is a CO removal catalyst of inducing CO shift reaction for allowing water and carbon monoxide to react to produce hydrogen and carbon dioxide, comprising:

a catalyst carrier having a cerium-zirconium composite oxide and a zirconium oxide; and a predetermined noble metal supported on the catalyst carrier.

The $2^{nd}$ aspect of the present invention is the CO removal catalyst as defined in the $1^{st}$ aspect of the present invention,. wherein;

the average particle diameter of the particulate cerium-zirconium composite oxide is greater than the average particle diameter of the particulate zirconium oxide;

the average particle diameter of the particulate zirconium oxide is greater than the average particle diameter of the predetermined particulate noble metal;

the predetermined noble metal is supported on the catalyst carrier more in the outer part thereof; and the content of the zirconium oxide in the catalyst carrier is greater in the outer part thereof.

The $3^{rd}$ aspect of the present invention is the CO removal catalyst as defined in the $1^{st}$ aspect of the present invention, wherein;

the solid content of the zirconium oxide in the catalyst carrier is substantially from not lower than about 0.5% by weight to not higher than about 5% by weight.

The $4^{th}$ aspect of the present invention is the CO removal catalyst as defined in the $1^{st}$ aspect of the present invention, wherein;

BET specific surface area of the catalyst carrier is substantially not lower than about 70% of BET specific surface area of powder obtained by grinding the catalyst carrier such that the average particle diameter of the resulting particles is substantially 4 μm.

The $5^{th}$ aspect of the present invention is the CO removal catalyst as defined in the $1^{st}$ aspect of the present invention, wherein;

the average particle diameter of the particulate cerium-zirconium composite oxide is substantially from not smaller than about 1 μm to not greater than about 15 μm;

the average particle diameter of the particulate zirconium oxide is substantially from not smaller than 0.01 μm to not greater than about 0.5 μm; and the average particle diameter of the predetermined particulate noble metal is substantially from not smaller than about 0.5 nm to not greater than about 8 nm.

The $6^{th}$ aspect of the present invention is the CO removal catalyst as defined in the $1^{st}$ aspect of the present invention, wherein;

the catalyst carrier is in substantially spherical form, and has a core having a diameter of substantially from not smaller than about 0.2 to not greater than about 0.5 times the diameter of the sphere and a shell formed outside the core.

The $7^{th}$ aspect of the present invention is the CO removal catalyst as defined in the $1^{st}$ aspect of the present invention, wherein;

the volume of pores in the catalyst carrier is substantially from not smaller than about 0.10 mL/g to not greater than about 0.20 mL/g.

The $8^{th}$ aspect of the present invention is the CO removal catalyst as defined in the $1^{st}$ aspect of the present invention, wherein;

the average particle diameter of the predetermined particulate noble metal is smaller than the diameter of pores in the catalyst carrier the distribution of which takes substantially maximum value.

The $9^{th}$ aspect of the present invention is the CO removal catalyst as defined in the $8^{th}$ aspect of the present invention, wherein;

the diameter of pores in the catalyst carrier the distribution of which takes substantially maximum value is substantially from not smaller than about 3 nm to not greater than about 10 nm.

The $10^{th}$ aspect of the present invention is a method of producing a CO removal catalyst defined in the $1^{st}$ aspect of the present invention, comprising:

a forming step of adding zirconia sol to form the cerium-zirconia composite oxide;

a producing step of calcining the cerium-zirconium composite oxide thus formed to produce the catalyst carrier; and a supporting step of supporting the predetermined noble metal on the catalyst carrier thus produced.

The 11th aspect of the present invention is the method of producing a CO removal catalyst as defined in the 10th aspect of the present invention,
wherein;
the zirconia sol is added in a gradually increasing amount.

The 12th aspect of the present invention is a hydrogen purifying device comprising:
a reactor filled with a CO removal catalyst defined in Claim 1 of removing CO from a modified gas containing at least CO and water vapor.

The 13th aspect of the present invention is the hydrogen purifying device as defined in the 12th aspect of the present invention,
wherein;
the packing density of the CO removal catalyst is substantially from not smaller than about 1.1 g/cm$^3$ to not greater than about 2.0 g/cm$^3$.

The 14th aspect of the present invention is a fuel cell system comprising:
a hydrogen purifying device defined in the 12th aspect of the present invention; and
a fuel cell of generating electricity using a modified gas from which CO has been removed.

DESCRIPTION OF SYMBOLS

1 CO removal catalyst (catalyst)
2 Reactor
3 Modified gas inlet
4 Modified gas outlet
5 Diffuser plate
6 Heat insulating material
11 Modifying portion
12 CO modifying portion
13 CO purifying portion
14 Fuel cell portion
15 Electrolyte membrane
16 Heating portion
17 Starting material supplying portion
18 Heating fuel supplying portion
19 Water supplying portion
20 Purifying air supplying portion
21 Cathode air supplying portion

PREFERRED EMBODIMENTS OF THE INVENTION

Embodiments of implementation of the invention will be described hereinafter in connection with the drawings.

Embodiment 1

Figure 1:
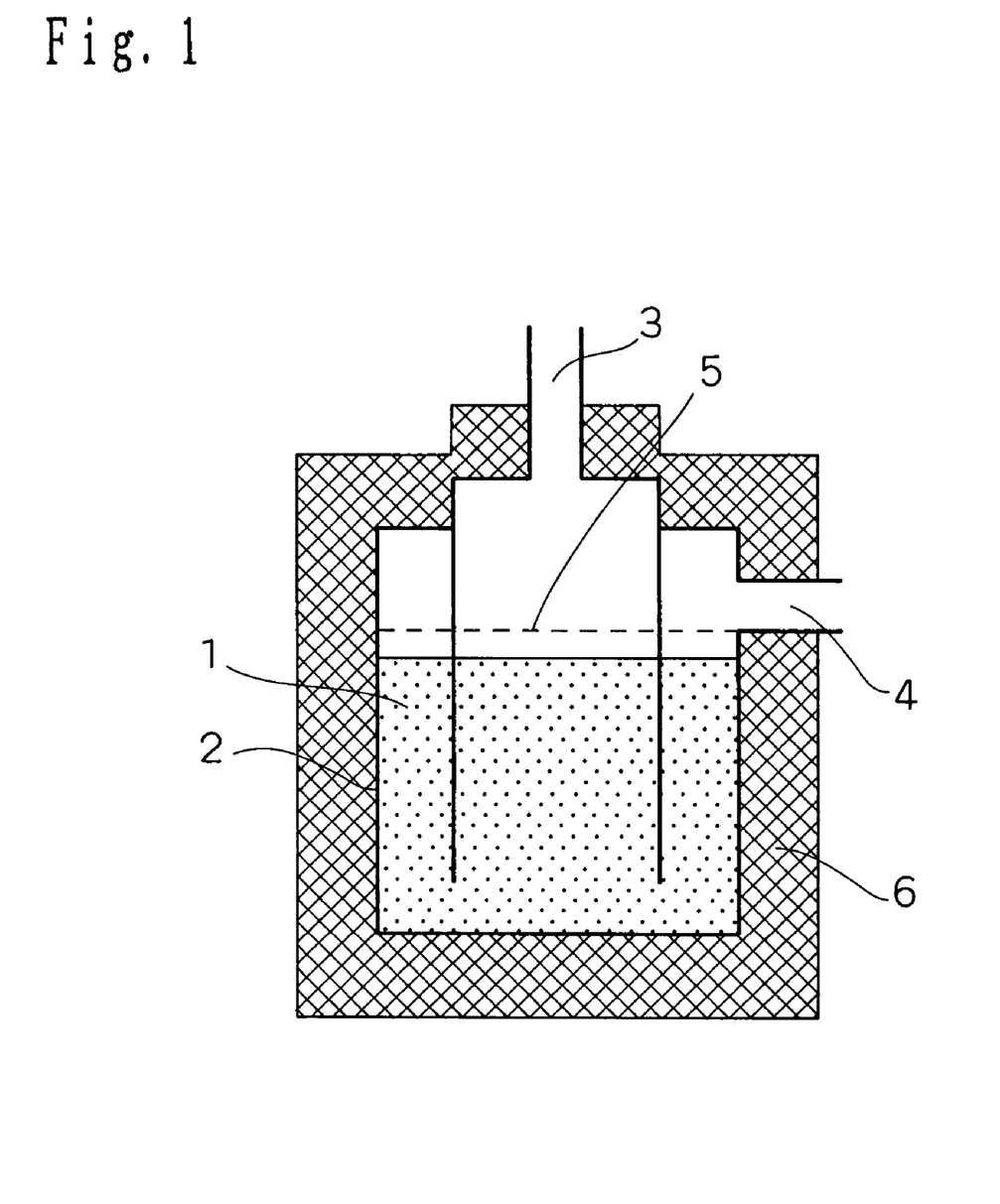
FIG. 1 is a schematic longitudinal sectional view illustrating the structure of the hydrogen purifying device according to the embodiment 1 of implementation of the invention.

Firstly, the configuration of a hydrogen purifying device according to the present embodiment of implementation of the invention will be described in connection with FIG. 1. FIG. 1 is a schematic longitudinal sectional view illustrating the configuration of a hydrogen purifying device according to an embodiment 1 of implementation of the invention.

In FIG. 1, the reference numeral 1 indicates a CO removal catalyst (hereinafter simply referred to as "catalyst") which is provided inside a reactor 2. The reference numeral 3 indicates a modified gas inlet through which a modified gas is introduced. The modified gas which has been reacted is then discharged from a modified gas outlet 4.

Provided upstream the catalyst 1 is a diffuser plate 5 so that the modified gas can flow uniformly. In order to keep the reactor at a constant temperature, the periphery of the reactor is covered by an insulating material 6 made of ceramic wool at necessary areas.

The catalyst 1 was prepared as follows.

First, to a 1:1 (by weight) composite oxide of ceria ($CeO_2$) and zirconia ($ZrO_2$) was added zirconia sol. The mixture was subjected to rolling so that it was formed into spherical particles having a diameter of 3 mm which were dried, and then calcined at 500° C. in the air to obtain a catalyst carrier. Subsequently, to the catalyst carrier was added a nitric acid solution of dinitrodiamine-platinum complex. The catalyst carrier was then calcined at 500° C. in the air so that Pt was supported on the catalyst carrier to obtain a catalyst 1.

The CO removal catalyst (catalyst) 1 corresponds to the CO removal catalyst of the invention. Pt according to the present embodiment corresponds to the predetermined noble metal of the invention. The reactor 2 corresponds to the reactor of the invention. The hydrogen purifying device according to the present embodiment corresponds to the hydrogen purifying device of the invention.

The operation of the hydrogen purifying device according to the present embodiment will be described hereinafter.

Examples of the fuel to be used in the production of a modified gas to be supplied into the hydrogen purifying device include natural gas, methanol, and gasoline. Examples of the modifying method include water vapor modification involving the addition of water vapor, and partial modification involving the addition of air. The invention will be described with reference to the case where a natural gas is subjected to water vapor modification to obtain a modified gas.

The composition of the modified gas obtained by water vapor modification of a natural gas varies somewhat with the temperature of the modified catalyst. Referring to the average value excluding water vapor, the modified gas contains hydrogen in an amount of about 80% and carbon dioxide and carbon monoxide each in an amount of about 10%.

Since the modification reaction of a natural gas occurs at a temperature of from about 500° C. to about 800° C. and the modification reaction involving the reaction of CO with water vapor proceeds at a temperature of from about 150° C. to about 350° C., the modified gas is cooled in the zone before the modified gas inlet 3 before being supplied. The modified gas which has passed through the catalyst 1 has a CO content as small as about 1%. The modified gas is then discharged through the modified gas outlet 4.

The principle of the operation of the hydrogen purifying device according to the present embodiment will be described hereinafter.

The CO modification reaction is an equilibrium reaction depending on temperature. The lower the temperature at which the reaction occurs is, the more can be reduced CO concentration. On the other hand, as the temperature goes down, the rate of reaction on the catalyst drops. Accordingly, there is a temperature at which CO concentration becomes minimum.

A copper-based modification catalyst such as copper-zinc catalyst and copper-chromium catalyst which is used as a CO modification catalyst in the related art hydrogen purifying device allows CO modification reaction at a temperature as low as about 150° C. to about 250° C. and thus can reduce CO concentration to a range of from hundred parts per million to thousand parts per million under some conditions.

However, such a copper-based catalyst not only needs to be activated by a reducing gas such as hydrogen and modified gas flowing through the reactor in which it has been packed but also has a heat resistance as low as about 300° C. Accordingly, it is necessary that the reducing gas be diluted with an inert gas or the like before being supplied or be allowed to flow in a small amount to cause gradual reaction so that the reaction heat generated by activation is not so high that the temperature does not go beyond the upper limit of temperature at which the catalyst can stand. Thus, it takes much time to activate the catalyst. It is also necessary that the catalyst be heated slowly for a long period of time to prevent excessive temperature rise beyond the upper limit of the temperature at which the catalyst can stand while the device is started. Thus, such a copper-based catalyst has many problems when used for purposes requiring frequent repetition of starting and suspension.

On the other hand, the hydrogen purifying device of the invention comprises as a catalyst 1 a catalyst comprising a noble metal as an active component. Thus, the catalyst does not undergo great deterioration even when the ambient temperature is as high as about 500° C. during the starting of the device. Further, the catalyst 1 has a high heat resistance and thus does not need to take much time to undergo reduction for the purpose of inhibiting the heat generation due to reaction heat caused by the reduction reaction as in the copper-based catalyst. Moreover, even when air enters in the catalyst 1 while the operation of the device is suspended, the catalyst 1 undergoes less deterioration than the copper-based catalyst.

A noble metal catalyst comprising Pt, Pd, Rh, Ru or the like as an active component normally has a high activity and hence a relatively low reaction selectivity. Therefore, under some conditions, methanization reaction of CO or carbon dioxide can proceed as a side reaction of CO modification reaction. The consumption of hydrogen by the progress of the methanization reaction can reduce the efficiency of the entire device.

In general, at a temperature range of from about 150° C. to about 450° C., where CO modification reaction occurs, the higher the temperature is, the more remarkable is the methanization reaction. However, the percent production of methane varies with the kind of noble metal. This is because different noble metals have different CO adsorption mechanisms. Pd, Rh and Ru, which have a CO adsorption mechanism allowing easy methanization reaction, cause the production of methane at a relatively low temperature and tend to have a reduced range of temperature within which CO modification reaction can occur.

On the contrary, Pt catalyst to be used in the present embodiment can cause methanization reaction relatively difficultly and thus is extremely suitable for CO modification reaction over a wide temperature range.

Further, ceria exerts an effect of inhibiting methanization of CO on Pt and an effect of enhancing the rate of CO modification reaction. In general, a noble metal catalyst comprises a stable catalyst carrier having a high heat resistance such as alumina, zirconia and titania. However, when a catalyst comprising Pt supported on such a catalyst carrier is used in CO modification reaction, methanization reaction can easily proceed at a temperature of not lower than 300° C.

In the case where ceria exists with Pt, methanization reaction proceeds little even at a temperature as high as not lower than 400° C. This is because Ce in ceria has an oxidation number of 3 or 4 and has an effect of storing oxygen. Thus, oxygen can be easily withdrawn from the water molecule adsorbed. Thus, the oxygen can be easily supplied onto Pt to which CO has been adsorbed. Another reason is that the electronic state of Pt is affected such that C—O bond of CO molecules adsorbed to Pt can be difficultly severed.

When repeatedly subjected to oxidation and reduction, an oxide which assumes a plurality of oxidation states such as ceria undergoes structural change involving atomization or reduction of specific surface area. Therefore, Pt is supported on ceria which has been supported on a stable carrier such as zirconia, alumina and titania.

In the case where the catalyst is used in an actual reactor, it is necessary that the catalyst be formed into tablet or sphere. Therefore, a carrier such as zirconia is dipped in an aqueous solution of cerium nitrate or the like so that ceria is supported on the carrier. However, when Pt is supported on a catalyst carrier having ceria supported on formed zirconia, Pt is supported on the area of the carrier on which ceria is not supported, lowering the activity of the catalyst or allowing easy methanization reaction. In other words, in order to enhance the low temperature activity of the catalyst and hence inhibit methanization reaction, it is desired to support Pt on the area of the carrier on which ceria is supported.

When Pt is supported on a catalyst carrier formed only by a ceria-zirconia composite oxide which has been previously prepared as in the present embodiment, Pt is not supported on the area of the carrier on which ceria is not supported, enhancing the catalyst activity and allowing little methanization reaction.

Examples of the method of molding a ceria-zirconia composite oxide to prepare a catalyst carrier include compression molding method which comprises pressing an oxide powder to form tablets, extrusion method, and rolling method which comprises rolling the material to spheres. However, the catalyst carrier obtained by forming only a powder as a starting material is subject to disintegration resulting in atomization when used under conditions such that heat shock is applied, water vapor exists or oxidation/reduction repeatedly occurs.

Therefore, an inorganic binder (alumina sol, silica sol, zirconia sol, titania sol, etc.) which is sintered to bind oxide particles when calcined is used. Such an inorganic binder is obtained by stabilizing a particulate oxide such as alumina and silica or particulate hydroxide in the form of a colloid solution in dilute nitric acid, carboxylic acid or the like and is used to mold an oxide powder or coat a substrate. When such an inorganic binder is used, the resulting molded product can be kept in its original shape over an extended period of time even when used under the aforementioned conditions such that heat shock is applied or water vapor exists.

In particular, zirconia sol, which is an inorganic binder having a good affinity for ceria, is preferably used as in the present embodiment.

When zirconia sol is calcined at about 500° C., it has a BET specific surface area of about 100 m² per gram but exhibits a high affinity for ceria and thus can enhance the strength of molded product even when used in a small amount. The value of BET specific surface area can be determined by allowing nitrogen to be adsorbed by a powder, and then measuring the amount of nitrogen adsorbed by the powder as specific surface area of the powder.

Figure 3:
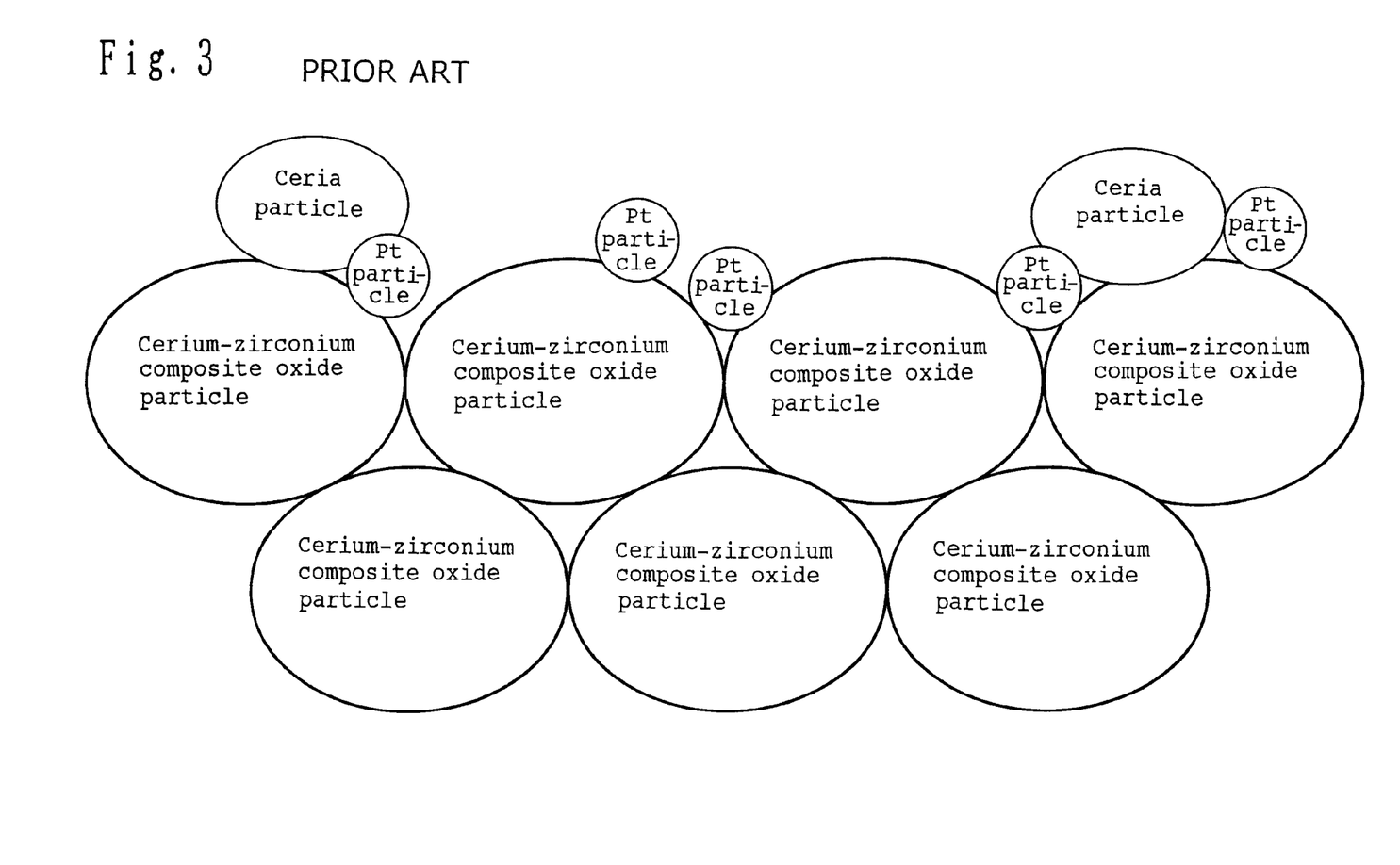
FIG. 3 is a diagram illustrating the structure of the related art CO removal catalyst comprising a cerium-zirconium composite oxide.

As shown in FIG. 3, which is a diagram illustrating the structure of a related art CO removal catalyst comprising a cerium-zirconium composite oxide, ceria which has been left undissolved in solid state at the step of preparing the cerium-zirconium composite oxide can separate out on the surface of the cerium-zirconium composite oxide. As previously mentioned, ceria which has separated out reacted with carbon dioxide or water in the modified gas to produce carbonates or the like (not shown) which then cover the surface of Pt and thus lower the catalyst activity.

Figure 4:
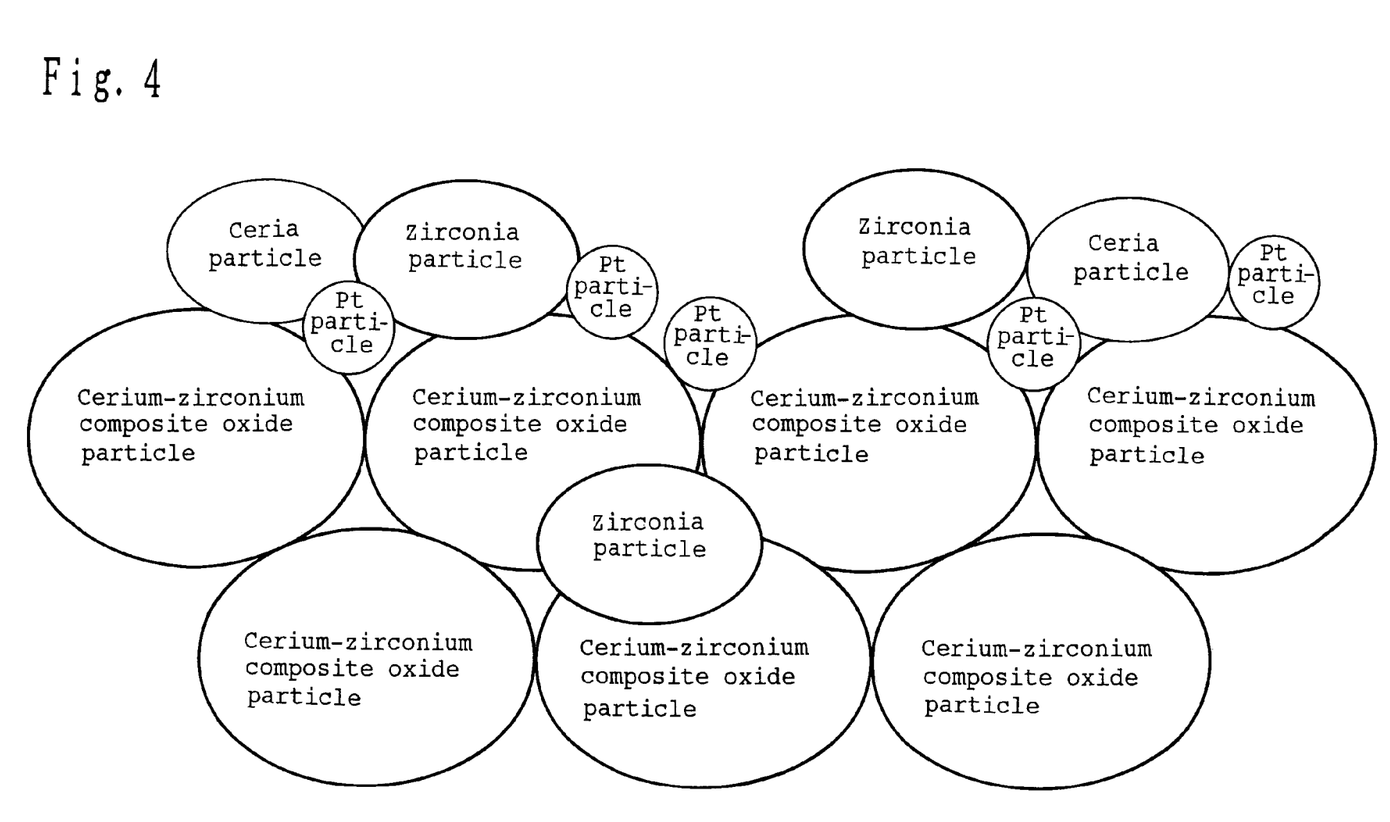
FIG. 4 is a diagram illustrating the structure of the CO removal catalyst comprising a cerium-zirconium composite oxide and zirconia sol according to the embodiment 1 of implementation of the invention.

Therefore, as shown in FIG. 4, which is a diagram illustrating the structure of CO removal catalyst comprising the cerium-zirconium composite oxide and zirconia sol according to the embodiment 1 of implementation of the invention, pelletization is effected using zirconia sol to form a cerium-zirconium composite oxide powder. This makes it little possible that the zirconia sol can be attached to ceria which has been left undissolved in solid state at a step of preparing the cerium-zirconium composite oxide and separated out on the surface of the cerium-zirconium composite oxide, producing carbonates or the like as mentioned above. Therefore, the deterioration of the catalyst by ceria which has separated out on the surface of the cerium-zirconium composite oxide can be inhibited.

Since zirconia forms a solid solution with ceria at a temperature as low as about 500° C. when used in a small amount, activity drop or methanization is difficult to occur even when Pt is supported on the zirconia portion derived from the inorganic binder close to the ceria-zirconia powder.

The amount of zirconia sol to be added is preferably from about 0.5 to about 5% by weight based on the weight of the ceria-zirconia composite oxide as calculated in terms of solid content of zirconium oxide in zirconia sol. When the amount of zirconia sol is not higher than about 0.5% by weight, the resulting molded product exhibits a slightly reduced strength. On the contrary, when the amount of zirconia sol is not lower than about 5% by weight, activity drop or methanization is slightly outstanding.

The zirconia content in the periphery of the catalyst carrier is preferably higher in the interior of the catalyst carrier. By raising the zirconia content in the periphery of the catalyst carrier, the strength of the molded product can be raised even if zirconia sol is added in a small amount. Referring to specific means, if rolling method is used to form spheres, the amount of the binder to be added is increased during the process of gradually rolling the powder into a bigger size so that the amount of the binder to be added reaches maximum at the end of molding.

While the present embodiment has been described with reference to the case where the catalyst is in the form of sphere, which can most difficultly crack and withstand heat shock, the shape of the catalyst is not limited so far as the catalyst is formed only by the ceria-zirconia composite oxide for the aforementioned reason and thus may be tabular or columnar as developed by compression molding, extrusion or the like.

BET specific surface area of the catalyst carrier thus molded is preferably from about 70% to about 100% of the specific surface area of a powder obtained by grinding the catalyst carrier. In this case, when the catalyst is used up to the interior thereof for reaction, the volume of the reactor can be reduced. Most preferably, the specific surface area of the powder and the molded product are the same. However, when the specific surface area of the molded product is not lower than about 70% of that of the powder, sufficient properties can be obtained.

Referring to specific method, an organic material which disappears when calcined is added during the molding of the catalyst carrier. The mixture is then molded. As the organic material to be added there may be used any ordinary material for use in the molding of powder. Examples of such an organic material include methyl cellulose, and polyvinyl alcohol. Such an organic material flies when calcined after molding to form pores later, making it easy for gas to diffuse into the interior of the catalyst carrier. The term "grinding" as used herein is meant to indicate grinding of the molded product in a mortar for several minutes resulting in the formation of a power having an average particle diameter of about 4 μm rather than mechanical grinding such as atomization of powder in ball mill or the like.

The supported amount of Pt may be such that Pt can be highly dispersed to provide a necessary activity. The greater the supported amount of Pt is, the greater is the size of the resulting particles and the greater is the amount of Pt that makes no contribution to reaction. On the contrary, the smaller the content of Pt is, the more difficultly can be obtained a sufficient activity. In general, the supported amount of Pt is preferably between about 0.1% by weight and about 5% by weight based on the weight of the catalyst carrier. Referring to the supported amount of Pt, those skilled in the art may select optimum value from experimental data, etc.

While the present embodiment has been described with reference to the case where a composite oxide formed only by cerium and zirconium, an element having an effect of enhancing heat resistance such as Al, Si and Ti or a rare earth element which enhances the effect of oxidizing/reducing cerium such as lanthanum, praseodymium and neodium may be added to the composite oxide.

Embodiment 2

Figure 2:
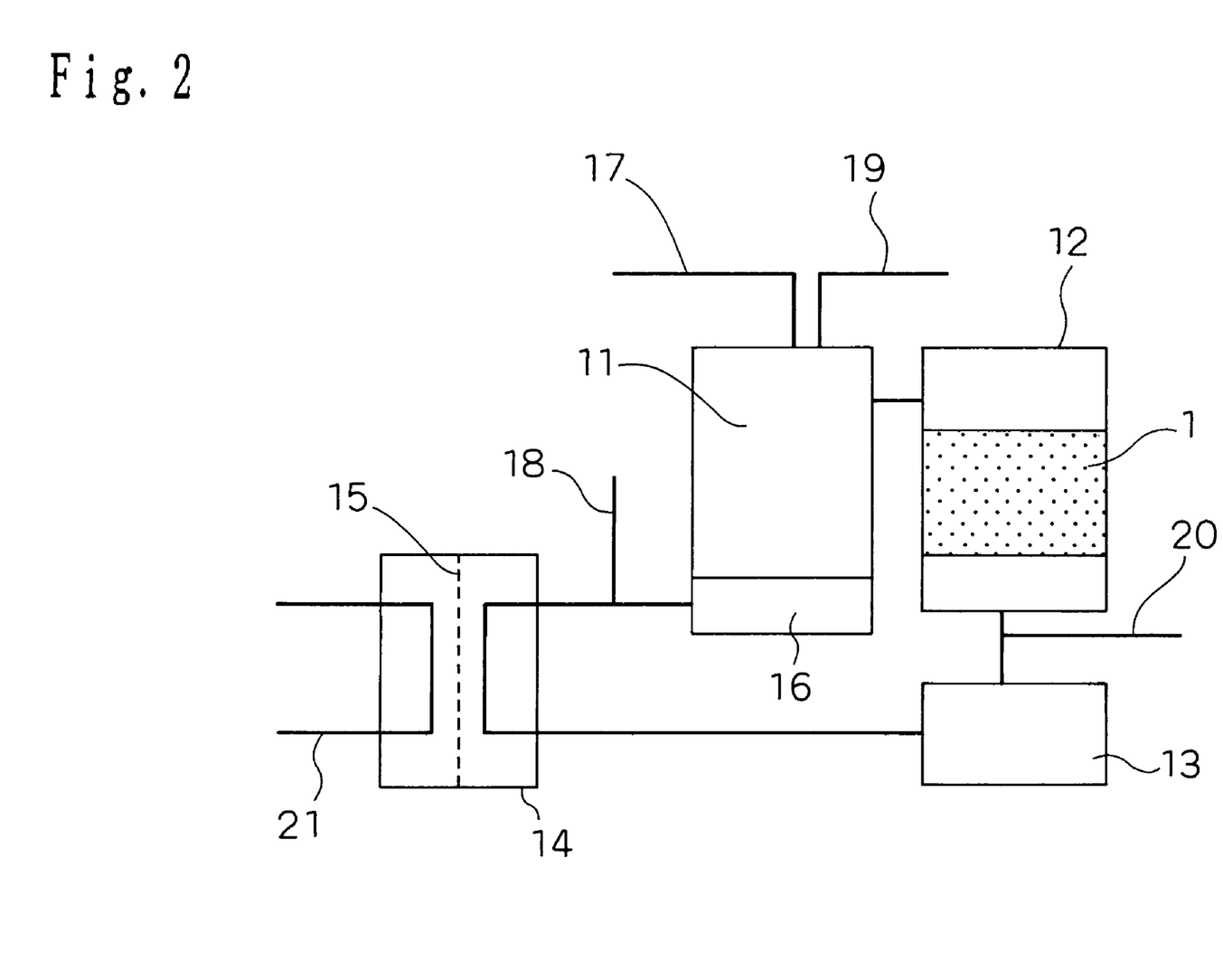
FIG. 2 is a schematic diagram illustrating the structure of the fuel cell system according to the embodiment 2 of implementation of the invention.

An embodiment 2 of implementation of the invention will be described hereinafter. FIG. 2 is a schematic diagram illustrating the structure of a fuel cell system according to the embodiment 2 of implementation of the invention. As shown in FIG. 2, the hydrogen purifying device according to the embodiment 1 of implementation of the invention is incorporated in the fuel cell system as CO modifying portion 12.

In FIG. 2, the reference numeral 11 indicates a modifying portion, the reference numeral 12 indicates a CO modifying portion corresponding to the hydrogen purifying device of the invention, the reference numeral 13 indicates a CO purifying portion, the reference numeral 14 indicates a fuel cell portion, and the reference numeral 15 indicates a protonically-conductive solid polymer electrolyte membrane.

There are provided a heating portion 16 of heating the modifying portion, a starting material supplying portion 17 of supplying a starting material into the modifying portion, a heating fuel supplying portion 18 of supplying a heating fuel, a water supplying portion 19 of supplying water to be used for reaction, a purifying air supplying portion 20 for use in selective oxidation reaction, and a cathode air supplying portion, 21 of supplying oxygen to be used in the electricity generation by the fuel cell.

The interior of the modifying portion 11 is filled with a modification catalyst comprising Ru supported on alumina, the interior of the CO modifying portion 12 is filled with a catalyst 1, and the interior of the CO purifying portion 13 is filled with a CO purification catalyst comprising pt supported on alumina. The catalysts to be packed in the modifying portion 11 and the CO purifying portion 13 are catalysts which are normally used in hydrogen producing devices. Even when other catalysts having similar functions are used, the effect of the invention can be exerted. For example, as the modification catalyst there may be used an Ni catalyst. As the CO purification catalyst there may be used a Ru catalyst or the like.

The CO modifying portion 12 corresponds to the hydrogen purifying device of the invention. Further, the fuel cell portion 14 corresponds to the fuel cell of the invention. Moreover, the fuel cell system according to the present embodiment corresponds to the fuel cell system of the invention.

The operation of the fuel cell system according to the present embodiment will be described hereinafter.

Examples of the fuel to be supplied into the modifying portion 11 include natural gas, methanol, and gasoline. Examples of the modifying method include water vapor modification involving the addition of water vapor, and partial modification involving the addition of air. The invention will be described hereinafter with reference to the case where a natural gas is subjected to water vapor modification to obtain a modified gas.

The natural gas which is a starting material is supplied into the modifying portion 11 from the starting material supplying portion 17. The water supplying portion 19 supplies water into the modifying portion 11 where it is evaporated and mixed with the starting material which is then brought into contact with the modification catalyst packed in the modifying portion 11. The catalyst is heated to a temperature of about 700° C. so that the starting material is reacted with water vapor and converted to a modified gas mainly composed of hydrogen. The composition of the modified gas thus produced varies somewhat with the temperature of the modification catalyst. Referring to the average value excluding water vapor, the modified gas contains hydrogen in an amount of about 80% and carbon dioxide and carbon monoxide each in an amount of about 10%. The modified gas undergoes shift reaction at the CO modifying portion 12, which is provided down stream the modifying portion 11, to reduce its CO concentration to a range of from about 0.3 to about 1%. Subsequently, CO is reacted with oxygen in the air supplied from the purifying air supplying portion 20 to reduce the CO concentration of the modified gas to not higher than 10 ppm.

The modified gas from which CO has thus been removed is then supplied into the fuel cell portion 14. At the fuel cell portion 14, hydrogen in the modified gas is then reacted with the air supplied from the cathode air supplying portion 21 to generate electricity.

Since heat is generated as well during the generation of electricity, the fuel cell portion 14 is cooled with a cooling water (not shown) to keep the temperature of the fuel cell portion 14 constant. The hydrogen which has been left unreacted in the fuel cell portion 14 is then supplied as an off-gas into the heating portion 16 of heating the modifying portion 11. In the case where the off-gas is not sufficient to give the desired heat, a fuel is supplied from the heating fuel supplying portion 18.

In the case where this fuel cell system is used as a small-scale electricity-generating facility for household or other purposes, it is necessary that the fuel cell system be frequently actuated and suspended. When the fuel cell system is frequently actuated or suspended, the catalyst packed in the CO modifying portion 12 in particular can undergo deterioration or cracking resulting in the clogging of the passage in the piping. This is attributed to the heat shock developed between room temperature and temperature required for reaction and the change of atmosphere involving the condensation of water vapor in the modified gas on the catalyst and the repetition of oxidation and reduction.

In the present embodiment, the CO modifying portion 12 is filled with the catalyst 1 prepared in the embodiment 1. Therefore, even when actuation/suspension is repeated, the catalyst is little subject to cracking or powderization causing the clogging of the passage resulting in the rise of pressure loss. Further, since CO concentration can be reduced to a low value and methanization reaction which is a side reaction can difficultly occur, the hydrogen which has been purified in the modifying portion can be efficiently supplied into the fuel cell portion 14 to enhance the efficiency of electricity generation (generated amount of electricity per unit amount of fuel supplied).

EXAMPLE

Example 1

Cerium and zirconium nitrate were each dissolved in purified water. The two aqueous solutions were then mixed at a ratio of 1:1 by weight as calculated in terms of $CeO_2$ and $ZrO_2$. Subsequently, the mixture was subjected to ordinary coprecipitation to prepare a precipitate which was then calcined at 500° C. in the air atmosphere to obtain a ceria-zirconia composite oxide powder. The ceria-zirconia composite oxide powder thus obtained was then measured for BET specific surface area by nitrogen adsorption method, which is normally conducted. The result was 105 $m^2$ per gram.

The powder was then subjected to structural analysis by powder X-ray diffractometry. No diffraction line attributed to single phase of ceria and zirconia was observed. It was thus confirmed that a uniform solid solution had been formed.

To the ceria-zirconia composite oxide thus obtained were then added a zirconia binder and a small amount of purified water such that the solid content in the zirconia sol reached a range of from 0.1 to 10% by weight as shown in Table 1 (calculated in term of $ZrO_2$). The mixture was kneaded by a kneader, and then formed into spherical particles having a diameter of 3 mm. The particulate material was dried for 24 hours, and then calcined at 500° C. in the air to obtain catalyst carriers as Sample Nos. 1 to 9.

To the catalyst carrier was then added a nitric acid solution of dinitrodiamine-platinum complex in such an amount that the proportion of Pt reached 1% by weight. The mixture was dried for 24 hours, and then calcined at 500° C. in the air to obtain a catalyst.

The catalyst thus obtained was packed in the reactor shown in FIG. 1. A modified gas comprising 8% of carbon monoxide, 8% of carbon dioxide, 20% of water vapor and the balance of hydrogen was then introduced into the reactor through the modified gas inlet 3 at a flow rate of 10 l per minute. The modified gas was then reacted on the catalyst 1 while the temperature thereof was being controlled. The composition of the gas discharged from the modified gas outlet 4 was then measured by gas chromatography.

The minimum CO concentration with the change of temperature and the concentration of methane in the gas produced by reaction at the catalyst temperature of 400° C. were then measured. The catalyst was dipped in water at room temperature, heated to 400° C. in 10 minutes, and then cooled to room temperature in 10 minutes. This procedure was repeated 10 times. The rate at which the catalyst was cracked was measured. The results are set forth in Table 1.

TABLE 1

| Sample No. | Added amount of Zr sol (wt-%) | CO concentration (vol-%) | Methane concentration at 400° C. (vol-%) | Cracking (%) |
|---|---|---|---|---|
| 1 | 0.1 | 0.30 | 0 | 5 |
| 2 | 0.3 | 0.33 | 0 | 2 |
| 3 | 0.5 | 0.35 | 0.05 | 0.5 |
| 4 | 1 | 0.38 | 0.08 | 0.3 |
| 5 | 3 | 0.40 | 0.10 | 0.1 |
| 6 | 5 | 0.5 | 0.20 | 0.05 |
| 7 | 6 | 0.8 | 1.5 | 0.03 |
| 8 | 8 | 1.1 | 4 | 0 |
| 9 | 10 | 1.2 | 5 | 0 |

The experimental results shown in Table 1 substantiate the previously mentioned facts. In some detail, when the added amount of zirconia sol falls below 0.5% by weight, the rate at which the catalyst cracks rises somewhat. Further, when the added amount of zirconia sol (Zr sol) is not lower than 5% by weight, the catalyst activity drops, raising the minimum CO concentration somewhat. At the same time, the concentration of methane produced by methanization at 400° C. rises somewhat.

Example 2

In the same manner as in Example 1, to a ceria-zirconia composite oxide was added 3% by weight of zirconia sol to prepare a catalyst carrier. Pt was then supported on the catalyst carrier in an amount of from 0.3 to 5% by weight to obtain catalysts as Sample Nos. 10 to 15.

The reaction procedure of Example 1 was then followed. The composition of the gas produced by the reaction was then measured. The results are set forth in Table 2.

TABLE 2

| Sample No. | Supported amount of Pt (wt-%) | CO concentration (vol-%) | Methane concentration at 400° C. (vol-%) |
|---|---|---|---|
| 10 | 0.3 | 1.3 | 0.01 |
| 11 | 0.5 | 0.90 | 0.02 |
| 12 | 1.0 | 0.40 | 0.10 |
| 13 | 2.0 | 0.30 | 0.20 |
| 14 | 3.0 | 0.20 | 0.50 |
| 15 | 5.0 | 0.10 | 0.90 |

Example 3

In the same manner as in Example 1, to a ceria-zirconia composite oxide was added 3% by weight of zirconia sol to prepare catalyst carrier. During this procedure, methyl cellulose was then added as an organic binder in different amounts to obtain catalyst carriers having different porosities. Pt was supported on these catalyst carriers in an amount of 2% by weight to obtain catalysts as Sample Nos. 16 to 21.

These catalyst carriers and the powders obtained by grinding these catalyst carriers were each then measured for BET specific surface area. All these powders exhibited a BET specific surface area of 105 m$^2$ per gram.

The reaction procedure of Example 1 was followed. The composition of the gas obtained by the reaction was then measured. The results are set forth in Table 3.

TABLE 3

| Sample No. | Specific surface area (%) | CO concentration (vol-%) | Methane concentration at 400° C. (vol-%) |
|---|---|---|---|
| 16 | 50 | 0.90 | 2.5 |
| 17 | 60 | 0.80 | 1.5 |
| 18 | 70 | 0.40 | 0.10 |
| 19 | 80 | 0.38 | 0.08 |
| 20 | 90 | 0.37 | 0.10 |
| 21 | 100 | 0.30 | 0.02 |

As can be seen in the results shown in Table 3, when the porosity of the molded catalyst carrier is raised such that the specific surface area of the molded product reaches not smaller than about 70%, CO concentration can be reduced more. Further, since Pt is uniformly supported on the carrier up to the interior thereof such that Pt is not supported concentratedly on the surface of the carrier at the step of supporting Pt, the methane concentration, too, can be suppressed to a low value.

Comparative Example 1

A zirconia power having a BET specific surface area of 108 m$^2$ per gram was added to zirconia sol. The mixture was then formed into spherical particles having a diameter of 3 mm in the same manner as in Example 1. The particulate material was then calcined at 500° C. in the air atmosphere. To the material thus calcined was then added an aqueous solution of cerium nitrate. The mixture was then calcined at 500° C. so that cerium oxide was supported on the carrier to obtain a catalyst carrier.

To the catalyst carrier was then added a nitric acid solution of dinitrodiamine-platinum complex in an amount such that the proportion of Pt reached a range of from 0.3 to 5% by weight. The mixture was dried for 24 hours, and then calcined at 500° C. in the air to obtain catalyst as Sample Nos. 22 to 27.

These catalysts were then measured in the same manner as in Example 1. Results shown in Table 4 were obtained.

TABLE 4

| Sample No. | Supported amount of Pt (wt-%) | CO concentration (vol-%) | Methane concentration at 400° C. (vol-%) |
|---|---|---|---|
| 22 | 0.3 | 1.6 | 1.0 |
| 23 | 0.5 | 1.0 | 2.0 |
| 24 | 1.0 | 0.8 | 4.0 |
| 25 | 2.0 | 0.7 | 4.5 |
| 26 | 3.0 | 0.5 | 4.8 |
| 27 | 5.0 | 0.4 | 5.0 |

Comparative Example 2

To the ceria-zirconia composite oxide prepared in Example 1 were then added an alumina binder and a small amount of purified water such that the solid content in the alumina sol reached a range of from 0.1 to 10% by weight as shown in Table 5 (calculated in term of $Al_2O_3$). The mixture was kneaded by a kneader, and then formed into spherical particles having a diameter of 3 mm. The particulate material was dried for 24 hours, and then calcined at 500° C. in the air to obtain catalyst carriers as Sample Nos. 28 to 36.

To the catalyst carrier was then added a nitric acid solution of dinitrodiamine-platinum complex in such an amount that the proportion of Pt reached 1% by weight. The mixture was dried for 24 hours, and then calcined at 500° C. in the air to obtain a catalyst.

The catalysts thus obtained were each then measured in the same manner as in Example 1. Results shown in Table 5 were obtained.

TABLE 5

| Sample No. | Added amount of Al sol (wt-%) | CO concentration (vol-%) | Methane concentration at 400° C. (vol-%) | Cracking (%) |
| --- | --- | --- | --- | --- |
| 28 | 0.1 | 0.35 | 0.5 | 5 |
| 29 | 0.3 | 0.4 | 0.5 | 5 |
| 30 | 0.5 | 0.5 | 0.8 | 5 |
| 31 | 1 | 0.8 | 1.2 | 5 |
| 32 | 3 | 1.0 | 1.5 | 4 |
| 33 | 5 | 1.5 | 2.0 | 3 |
| 34 | 6 | 1.6 | 2.5 | 3 |
| 35 | 8 | 1.8 | 4 | 2.5 |
| 36 | 10 | 2 | 5 | 2 |

Comparative Example 3

To the ceria-zirconia composite oxide prepared in Example 1 were then added a silica sol binder and a small amount of purified water such that the solid content in the silica sol reached a range of from 0.1 to 10% by weight as shown in Table 6 (calculated in term of $SiO_2$). The mixture was kneaded by a kneader, and then formed into spherical particles having a diameter of 3 mm. The particulate material was dried for 24 hours, and then calcined at 500° C. in the air to obtain catalyst carriers as Sample Nos. 37 to 45.

To the catalyst carrier was then added a nitric acid solution of dinitrodiamine-platinum complex in such an amount that the proportion of Pt reached 1% by weight. The mixture was dried for 24 hours, and then calcined at 500° C. in the air to obtain a catalyst.

The catalysts thus obtained were each then measured in the same manner as in Example 1. Results shown in Table 6 were obtained.

TABLE 6

| Sample No. | Added amount of Si sol (wt-%) | CO concentration (vol-%) | Methane concentration at 400° C. (vol-%) | Cracking (%) |
| --- | --- | --- | --- | --- |
| 37 | 0.1 | 0.33 | 0.5 | 5 |
| 38 | 0.3 | 0.40 | 0.5 | 5 |
| 39 | 0.5 | 0.50 | 0.5 | 5 |
| 40 | 1 | 0.60 | 0.8 | 5 |
| 41 | 3 | 0.70 | 1.8 | 5 |
| 42 | 5 | 1.0 | 1.5 | 5 |
| 43 | 6 | 1.5 | 2.0 | 4.5 |
| 44 | 8 | 1.8 | 3 | 4 |
| 45 | 10 | 2 | 4 | 3.5 |

Examples 1 to 3 and Comparative Examples 1 to 3 described above substantiated the following facts.

The catalyst obtained by supporting an additive such as cerium on a catalyst carrier obtained by molding a zirconia powder, and then supporting Pt on the catalyst carrier exhibits a low activity and causes remarkable methanization reaction as a side reaction (Comparative Example 1).

Further, the catalysts comprising alumina sol or silica sol instead of zirconia sol not only show similar phenomena but also tend to undergo remarkable cracking unless the amount of the binder is increased (Comparative Examples 2 and 3).

On the contrary, the catalysts obtained by supporting Pt on a catalyst carrier obtained by molding a ceria-zirconia composite oxide powder exhibit a high activity and cause considerably little side reactions (Examples 1 to 3).

As made obvious from the foreign matters description, the hydrogen purifying device of the invention comprises a CO removal catalyst the properties of which are improved to have a raised low temperature activity that causes little methanization reaction even at high temperatures, making it possible to reduce CO concentration in a stable manner and inhibit wasteful consumption of hydrogen.

(A) It is desirable that the average particle diameter of the particulate cerium-zirconium composite oxide of the invention be greater than that of the particulate zirconium oxide of the invention and the average particle diameter of the particulate zirconium oxide of the invention be greater than that of the predetermined particulate noble metal of the invention.

More particularly, it is desirable that the average particle diameter of the particulate cerium-zirconium composite oxide of the invention be substantially from not smaller than about 1 μm to not greater than about 15 μm, the average particle diameter of the particulate zirconium oxide of the invention be substantially from not smaller than about 0.01 μm to not greater than about 0.5 μm and the average particle diameter of the predetermined particulate noble metal be substantially from not smaller than about 0.5 nm to not greater than about 8 nm.

In order to substantiate these requirements, the particle diameter of one of particulate composite oxide, particulate Zr oxide and particulate Pt was varied with that of the remaining two particulate materials fixed to obtain catalysts as Sample Nos. 46 to 60.

(1) With the particle diameter of the particulate Zr oxide predetermined to 0.3 μm, the particle diameter of the particulate Pt predetermined to 1 nm, the supported amount of Pt predetermined to 1% by weight and the added amount of Zr sol predetermined to 3%, the particle diameter of the particulate composite oxide was varied between 0.5 μm and 20 μm to obtain catalysts as Sample Nos. 46 to 50. These catalysts were then examined for flying amount (wt-%) of catalyst powder that can clog the passage and CO concentration (vol-%) indicating activity. The results are set forth below.

TABLE 7

| Sample No. | Particle diameter of particulate composite oxide (μm) | Flying amount of catalyst powder (wt-%) | CO concentration (vol-%) |
| --- | --- | --- | --- |
| 46 | 0.5 | 2 | 0.35 |
| 47 | 1 | 0.05 | 0.40 |
| 48 | 8 | 0.01 | 0.40 |
| 49 | 15 | 0 | 0.45 |
| 50 | 20 | 0 | 0.8 |

The results shown in the table above give the following conclusions.

When the particle diameter of the particulate composite oxide is too small, the resulting catalyst powder can easily fly. The reason for this phenomenon is that when the particle diameter of the particulate composite oxide is too small, the Zr oxide particles can difficultly be distributed, causing the drop of integrity.

On the contrary, when the particle diameter of the particulate composite oxide is too great, CO concentration rises. The reason for this phenomenon is that when the particle diameter of the particulate composite oxide is too great, the resulting catalyst has a reduced area which comes in contact with reactive gas.

(2) With the particle diameter of the particulate composite oxide predetermined to 4 μm, the particle diameter of the particulate Pt predetermined to 1 nm, the supported amount of Pt predetermined to 1% by weight and the added amount of Zr sol predetermined to 3%, the particle diameter of the particulate Zr oxide was varied between 0.005 μm and 0.8 μm to obtain catalysts as Sample Nos. 51 to 55. These catalysts were then examined for CO concentration (vol-%) and cracking rate (%). The results are set forth below.

TABLE 8

| Sample No. | Particle diameter (μm) of particulate Zr oxide | CO concentration (vol-%) | Cracking (%) |
|---|---|---|---|
| 51 | 0.005 | 0.8 | 2 |
| 52 | 0.01 | 0.5 | 0.12 |
| 53 | 0.1 | 0.4 | 0.1 |
| 54 | 0.5 | 0.4 | 0.05 |
| 55 | 0.8 | 0.4 | 1 |

The results shown in the table above give the following conclusions.

When the particle diameter of the particulate Zr oxide is too small, the resulting catalyst undergoes more cracking and causes the rise of CO concentration. The reason for this phenomenon is that when the particle diameter of the particulate Zr oxide is too small, Pt particles are supported on the particulate Zr oxide.

On the contrary, also when the particle diameter of the particulate Zr oxide is too great, the resulting catalyst undergoes more cracking. The reason for this phenomenon is that when the particle diameter of the particulate Zr oxide is too great, the particulate Zr oxide can be difficultly sintered, causing the drop of integrity.

(3) With the particle diameter of the particulate composite oxide predetermined to 4 μm, the particle diameter of the particulate Zr oxide predetermined to 0.3 μm, the supported amount of Pt predetermined to 1% by weight and the added amount of Zr sol predetermined to 3%, the particle diameter of the particulate Pt was varied between 0.2 nm and 10 nm to obtain catalysts as Sample Nos. 56 to 60. These catalysts were then examined for CO concentration (vol-%) and methane concentration (vol-%) at 400° C. The results are set forth below.

TABLE 9

| Sample No. | Particle diameter of particulate Pt (nm) | CO concentration (vol-%) | Methane concentration at 400° C. (vol-%) |
|---|---|---|---|
| 56 | 0.2 | 0.30 | 0.05 |
| 57 | 0.5 | 0.30 | 0.08 |
| 58 | 1 | 0.40 | 0.10 |
| 59 | 8 | 0.45 | 0.5 |
| 60 | 10 | 0.8 | 3 |

The results shown in the table above give the following conclusions.

When the particle diameter of the particulate Pt is too great, the resulting catalyst causes the rise of CO concentration as well as the rise of methane concentration. The reason for this phenomenon is that when the particle diameter of the particulate Pt is too great, the resulting catalyst has a reduced area which comes in contact with reactive gas.

When the particle diameter of the particulate Pt is too small, the resulting catalyst is so unstable that it can have a lowered activity as the reaction proceeds.

(B) It is also desirable that the catalyst carrier of the invention be substantially in spherical form and have a core having a diameter of substantially from not smaller than 0.2 times to not greater than 0.5 times that of the sphere and a shell formed outside the core.

In order to substantiate these requirements, as in the case where the catalyst which is Sample No. 5 is obtained, catalyst carriers having a core and a shell the ratio of the diameter of which is from 0.1 to 1.0 were prepared by previously forming cores having a diameter of from 0.3 mm to 3.0 mm, drying the cores for 24 hours, and then forming a shell outside each of these cores such that the diameter of the entire body is 3.0 mm Subsequently, Pt was supported on each of these catalyst carriers in such an amount that the weight proportion of Pt was 1% by weight to obtain catalysts as Sample Nos. 61 to 65. These catalysts were then examined for cracking rate (%). The results are set forth below.

TABLE 10

| Sample No. | (Diameter of core)/(diameter of catalyst carrier) | Cracking (%) |
|---|---|---|
| 61 | 0.1 | 0.1 |
| 62 | 0.2 | 0.01 |
| 63 | 0.5 | 0.02 |
| 64 | 0.7 | 0.1 |
| 65 | 1.0 (no core) | 0.1 |

The results shown in the table above give the following conclusions.

When the ratio of (diameter of core)/(diameter of catalyst carrier) is too small, the resulting catalyst undergoes cracking more frequently. The reason for this phenomenon is that when the ratio of (diameter of core)/(diameter of catalyst carrier) is too small, the catalyst carrier is ununiformly shaped during rolling and thus has a reduced strength.

On the contrary, also when the ratio of (diameter of core)/(diameter of catalyst carrier) is too great, the resulting catalyst undergoes cracking more frequently. The reason for this phenomenon is that when the ratio of (diameter of core)/(diameter of catalyst carrier) is too great, the resulting catalyst has a shell having a reduced thickness that can be peeled off and thus can reduce the strength thereof.

(C) It is further desirable that the volume of pores in the catalyst carrier of the invention be substantially from not smaller than 0.10 mL/g to not greater than 0.20 mL/g.

In order to substantiate these requirements, as in the case where the catalyst as Sample No. 5 is obtained, catalyst carriers having a pore volume of from about 0.05 to about 0.5 mL/g were prepared by adding methyl cellulose (organic binder). in different amounts. The pore volume was determined by a pore volume measuring method involving nitrogen adsorption. By supporting Pt on these catalyst carriers in such an amount that the weight proportion of Pt is 1% by weight, catalysts as Sample Nos. 66 to 71 were obtained. These catalysts were then examined for CO concentration (vol-%) and cracking rate (%). The results are set forth below.

TABLE 11

| Sample No. | Pore volume (mL/g) | CO concentration (vol-%) | Cracking (%) |
|---|---|---|---|
| 66 | 0.05 | 0.8 | 0.05 |
| 67 | 0.10 | 0.45 | 0.09 |
| 68 | 0.15 | 0.40 | 0.1 |
| 69 | 0.20 | 0.35 | 0.2 |
| 70 | 0.25 | 0.70 | 0.5 |
| 71 | 0.5 | 0.80 | 0.8 |

The results shown in the table above give the following conclusions.

When the pore volume is too small, the resulting catalyst cause rise of CO concentration. The reason for this phenomenon is that when the pore volume is too small, the resulting catalyst can difficultly adsorb CO and thus has a reduced activity.

On the contrary, when pore volume is too great, the resulting catalyst undergoes cracking more frequently. The reason for this phenomenon is that when the pore volume is too great, the resulting catalyst can have a reduced strength.

(D) It is further desirable that the average particle diameter of the predetermined particulate noble metal be smaller than the diameter of pores in the catalyst carrier of the invention the distribution of which takes substantially maximum value.

More particularly, it is desirable that the diameter of pore in the catalyst carrier of the invention the distribution of which takes substantially maximum value be substantially from not smaller than 3 nm to not greater than 10 nm.

In order to substantiate these requirements, as in the case where the catalysts as Sample Nos. 66 to 71 are obtained, catalysts as Sample Nos. 72 to 79 were obtained by varying the particle diameter of the particulate Pt and the maximum pore diameter in the distribution of pore diameter (occasionally referred to as "maximum of pore diameter"). These catalysts were then examined for CO concentration (vol-%) and methane concentration (vol-%) at 400° C. The results are set forth below.

TABLE 12

| Sample No. | Particle diameter of particulate Pt (nm) | Maximum of pore diameter (nm) | CO concentration (vol-%) | Methane concentration at 400° C. (vol-%) |
|---|---|---|---|---|
| 72 | 1 | 2 | 1.0 | 0.1 |
| 73 | 1 | 3 | 0.45 | 0.3 |
| 74 | 1 | 5 | 0.40 | 0.5 |
| 75 | 1 | 10 | 0.45 | 0.8 |
| 76 | 1 | 15 | 1.5 | 1.0 |
| 77 | 5 | 3 | 2 | 1.5 |
| 78 | 5 | 5 | 1.5 | 1.0 |
| 79 | 5 | 10 | 0.6 | 0.8 |

The results shown in the table above give the following conclusions.

When the diameter of pores the distribution of which take substantially maximum value is too small, the resulting catalyst causes the rise of CO concentration. The reason for this phenomenon is that when the maximum pore diameter in the distribution of pore diameter is too small, the pores are collapsed little by little, causing the Pt particles to be embedded in the catalyst and hence deteriorating the activity of the catalyst.

On the contrary, also when the maximum pore diameter in the distribution of pore diameter is too great, the resulting catalyst causes the rise of CO concentration. The reason for this phenomenon is that when the maximum pore diameter in the distribution of pore diameter of the catalyst carrier is too great, the resulting catalyst has a reduced area which comes in contact with reactive gas.

When the average particle diameter of the particulate Pt is greater than the maximum value in the distribution of pore diameter, the particulate Pt can be difficultly supported on the catalyst carrier, resulting in the preparation of a catalyst having a deteriorated activity.

(E) It is further desirable that the packing density of the CO removal catalyst of the invention be substantially from not smaller than about 1.1 g/cm³ to not greater than about 2.0 g/cm³.

In order to substantiate these requirements, as in the case where the catalyst as Sample No. 5 is obtained, catalyst carriers having a packing density of from 0.5 to 2.5 g/cm³ were prepared by adding methyl cellulose (organic binder) in different amounts. The packing density was determined by measuring the volume of 100 g of the catalyst carrier packed in a graduated cylinder. By supporting Pt on these catalyst carriers in such an amount that the weight proportion of Pt is 1% by light, catalysts as Sample Nos. 80 to 85 were obtained. These catalysts were then examined for CO concentration (vol-%) and cracking rate (%). The results are set forth below.

TABLE 13

| Sample No. | Packing density (g/cm³) | CO concentration (vol-%) | Cracking (%) |
|---|---|---|---|
| 80 | 0.5 | 0.50 | 5 |
| 81 | 1.0 | 0.45 | 2 |
| 82 | 1.1 | 0.40 | 0.5 |
| 83 | 1.5 | 0.40 | 0.1 |
| 84 | 2.0 | 0.45 | 0.09 |
| 85 | 2.5 | 0.70 | 0.01 |

The results shown in the table above give the following conclusions.

When the packing density is too small, the resulting catalyst undergoes cracking more frequently. The reason for this phenomenon is that when the packing density is too small, the resulting catalyst can have a reduced strength.

On the contrary, when the packing density is too great, the resulting catalyst causes the rise of CO concentration. The reason for this phenomenon is that when the packing density is too great, the resulting catalyst can difficultly adsorb CO and can have a reduced activity.

The invention is advantageous in that the properties of CO removal catalyst for use in the fuel cell electricity generation can be improved.

What is claimed is:

1. A hydrogen purifying device to induce a CO shift reaction for allowing water and carbon monoxide to react to produce hydrogen and carbon dioxide, comprising:
   a CO removal catalyst comprising a catalyst carrier containing cerium-zirconium composite oxide particulates and zirconium oxide particulates, and predetermined noble metal particulates supported on the catalyst carrier; and
   a reactor filled with the CO removal catalyst to remove CO from a modified gas containing at least CO and water vapor,
   wherein the average particle diameter of the cerium-zirconium composite oxide particulate is greater than the average particle diameter of the zirconium oxide particulate, and the average particle diameter of the zirconium oxide particulate is greater than the average particle diameter of the predetermined noble metal particulate.

2. The hydrogen purifying device as defined in claim 1, wherein:
the catalyst carrier is formed with inter and outer regions such that more of the predetermined noble metal particulate is supported on the outer region of the catalyst carrier than on the inter region thereof; and
a content of the zirconium oxide particulate in the catalyst carrier is greater in the outer region of the catalyst carrier relative to that of the inter region thereof.

3. The hydrogen purifying device as defined in claim 1, wherein the solid content of the zirconium oxide particulate in the catalyst carrier is substantially from not lower than 0.5% by weight to not higher than about 5% by weight.

4. The hydrogen purifying device as defined in claim 1, wherein BET specific surface area of the catalyst carrier is substantially not lower than about 70% of BET specific surface area of powder obtained by grinding the catalyst carrier such that an average particle diameter of resulting particles is substantially 4 μm.

5. The hydrogen purifying device as defined in claim 1, wherein the average particle of the cerium-zirconium composite oxide particulate is substantially from not smaller than about 1 μm to not greater than about 15 μm;
the average particle diameter of the zirconium oxide particulate is substantially from not smaller than about 0.01 μm to not greater than about 0.5 μm; and
the average particle diameter of the predetermined noble metal particulate is substantially from not smaller than about 0.5 nm to not greater than about 8 nm.

6. The hydrogen purifying device as defined in claim 1, wherein the catalyst carrier is in substantially spherical form, and has a core having a diameter of substantially from not smaller than about 0.2 to not greater than about 0.5 times a diameter of the sphere and a shell formed outside the core.

7. The hydrogen purifying device as defined in claim 1, wherein a volume of pores in the catalyst carrier is substantially from not smaller than about 0.10 mL/g to not greater than about 0.20 mL/g.

8. The hydrogen purifying device as defined in claim 1, wherein the average particle diameter of the predetermined noble metal particulate is smaller than a maximum diameter of pores in the catalyst carrier.

9. The hydrogen purifying device as defined in claim 8, wherein the maximum diameter of pores in the catalyst carrier is substantially from not smaller than 3 nm to not greater than 10 nm.

10. The hydrogen purifying device as defined in claim 1, wherein a packing density of the CO removal catalyst is substantially from not smaller than about 1.1 g/cm$^3$ to not greater than about 2.0 g/cm$^3$.

11. The hydrogen purifying device as defined in claim 1, wherein the modified gas from which CO having been removed is used by a fuel cell to generate electricity.

* * * * *

UNITED STATES PATENT AND TRADEMARK OFFICE
CERTIFICATE OF CORRECTION

PATENT NO. : 7,265,076 B2
APPLICATION NO. : 10/745223
DATED : September 4, 2007
INVENTOR(S) : Kiyoshi Taguchi et al.

It is certified that error appears in the above-identified patent and that said Letters Patent is hereby corrected as shown below:

Column 20

Beginning at line 57, claim 1 should read

-- a CO removal catalyst comprising a catalyst carrier containing a cerium-zirconium composite oxide and a zirconium oxide, and a predetermined noble metal particulates supported on the catalyst carrier; wherein the catalyst carrier is formed from cerium-zirconium composite oxide particulates and zirconium oxide particulates, and the average particle diameter of the cerium-zirconium composite oxide particulates is greater than the average particle diameter of the zirconium oxide particulates, and the average particle diameter of the particulates of the zirconium oxide is greater than the average particle diameter of the particulates of the predetermined noble metal, and     a reactor filled with the CO removal catalyst to remove CO from a modified gas containing at least CO and water vapor. --

Column 21

Line 25, "average particle of" should read -- average particle diameter of --

Signed and Sealed this

Twenty-ninth Day of April, 2008

JON W. DUDAS
*Director of the United States Patent and Trademark Office*